US007650632B2

(12) United States Patent
Yantzi (10) Patent No.: US 7,650,632 B2
(45) Date of Patent: Jan. 19, 2010

(54) PASSWORD MANAGEMENT

(75) Inventor: Donald J. Yantzi, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1038 days.

(21) Appl. No.: 10/809,563

(22) Filed: Mar. 25, 2004

(65) Prior Publication Data

US 2005/0005132 A1    Jan. 6, 2005

(30) Foreign Application Priority Data

Jul. 3, 2003    (CA) .................................. 2434276

(51) Int. Cl.
*H04L 9/32* (2006.01)
(52) U.S. Cl. .................. 726/6; 713/167; 726/2
(58) Field of Classification Search ............ 726/2, 726/6; 713/167
See application file for complete search history.

(56) References Cited

U.S. PATENT DOCUMENTS

| 5,241,594 | A | | 8/1993 | Kung et al. ............... 713/151 |
|---|---|---|---|---|
| 5,495,533 | A | | 2/1996 | Linehan et al. ........... 713/155 |
| 5,655,077 | A | * | 8/1997 | Jones et al. ................. 726/8 |
| 5,768,504 | A | | 6/1998 | Kells et al. ............... 713/201 |
| 5,774,551 | A | * | 6/1998 | Wu et al. .................. 713/155 |
| 5,781,784 | A | | 7/1998 | McKinley ................. 713/320 |
| 5,922,073 | A | * | 7/1999 | Shimada ..................... 726/6 |
| 5,944,824 | A | | 8/1999 | He ........................... 713/202 |
| 6,182,229 | B1 | * | 1/2001 | Nielsen ....................... 726/8 |
| 6,192,361 | B1 | * | 2/2001 | Huang ........................ 707/9 |
| 6,205,480 | B1 | | 3/2001 | Broadhurst et al. ....... 713/150 |
| 6,275,944 | B1 | | 8/2001 | Kao et al. ................. 713/202 |
| 6,295,607 | B1 | * | 9/2001 | Johnson ..................... 726/17 |
| 6,311,275 | B1 | | 10/2001 | Jin et al. .................. 713/201 |
| 6,317,834 | B1 | | 11/2001 | Gennaro et al. ........... 713/151 |
| 6,332,192 | B1 | | 12/2001 | Boroditsky et al. ....... 713/168 |
| 7,039,714 | B1 | * | 5/2006 | Blakley III et al. ........ 709/229 |
| 7,188,240 | B1 | * | 3/2007 | Berstis et al. ............. 713/100 |
| 7,581,245 | B2 | * | 8/2009 | Rojewski .................... 726/6 |
| 2001/0000537 | A1 | * | 4/2001 | Inala et al. ................. 707/500 |
| 2002/0095395 | A1 | * | 7/2002 | Larson et al. .............. 706/47 |
| 2002/0107914 | A1 | * | 8/2002 | Charisius et al. .......... 709/203 |
| 2002/0120867 | A1 | * | 8/2002 | Mitchell et al. ........... 713/201 |

(Continued)

OTHER PUBLICATIONS

Savitch (Walter Savitch, "Problem Solving with C++ The Object of Progamming", 2$^{nd}$ edition, 1999, ISBN 0201357496, p. 176-199).*

(Continued)

*Primary Examiner*—Michael J Simitoski
*Assistant Examiner*—Peter Poltorak
(74) *Attorney, Agent, or Firm*—Dillon & Yudell LLP (57) ABSTRACT

A password management solution which provides a user with convenient access to multiple resources (e.g. systems and services), and also provides the flexibility to establish varying password security requirements for each resource is disclosed. In an embodiment, there is provided a password registry for registering resources and securely storing user ID and encrypted password information. An unencrypted user-provided password may be encrypted by a process associated with each resource, using an encryption algorithm specific to that resource, before storage of the encrypted password in the password registry. An encrypted password retrieved from the password registry may be decrypted by a process associated with each resource using a decryption algorithm specific to that resource.

10 Claims, 4 Drawing Sheets

U.S. PATENT DOCUMENTS

| | | | |
|---|---|---|---|
| 2002/0122553 A1* | 9/2002 | Kao et al. | 380/28 |
| 2002/0138582 A1* | 9/2002 | Chandra et al. | 709/206 |
| 2003/0028813 A1* | 2/2003 | Lewis | 713/202 |
| 2003/0079147 A1* | 4/2003 | Hsieh et al. | 713/201 |
| 2005/0005094 A1* | 1/2005 | Jamieson et al. | 713/155 |

OTHER PUBLICATIONS

Honeyman (Peter Honeyman, "Pluggable Authentication Modules for Windows NT", Proceedings of the 2nd USENIX Windows NT Symposium Seattle, Washington, Aug. 3-4, 1998).*

U.S. Appl. No. 10/285,993, filed Oct. 31, 2002, Accessing a Remote Iseries or As/400 Computer System From the Eclipse Integrated Development Environment.

U.S. Appl. No. 09/428,566, filed Oct. 28, 1999, Universal Userid and Password Management for Internet Connected Devices.

U.S. Appl. No. 09/442,694, filed Nov. 18, 1999, Flexible Encryption Scheme for GSO Target Passwards.

U.S. Appl. No. 10/422,667, filed Apr. 24, 2003, Methods and Systems for Transparent Data Encryption and Decryption.

U.S. Appl. No. 09/662,244, filed Sep. 14, 2000, System and Method for Network Log-on by Associating Legacy Profiles With User Certificates.

RDN451, "Server private key encryption based user authentication management", No. 451162, Nov. 2001, p. 1970.

TDB—"Logon/Logoff Scheme for Dos Database Requester Which Works In Both Real And Protect Mode", Jun. 1991, p. 362-365, 91A 61574 / / AT8900535.

* cited by examiner

PASSWORD MANAGEMENT

BACKGROUND OF THE INVENTION

The present invention relates generally to data processing systems, and more specifically to password management.

In a centralized or distributed data processing system, a plurality of systems or services (collectively "resources") may be available to a user. Each of these resources may have an access control, requiring a user to have a valid user identification ("user ID"), as well as an authenticator, such as a valid key, token or password, to gain access. For the purposes of the present description, the term "password" is used in its broadest sense to cover any such authenticator. For a user requiring access to a number of resources, remembering and entering a user ID and password for each resource at the beginning of each logon session may be cumbersome. The problem may be exacerbated if there are multiple password management systems being used to manage each password. A solution for addressing this problem would be desirable.

SUMMARY OF THE INVENTION

The present invention provides a password management solution which provides a user with convenient access to multiple resources (e.g. systems and services), and also provides the flexibility to establish varying password security requirements for each resource.

In an embodiment, there is provided a password registry for registering resources and securely storing encrypted passwords and associated identifying information. The identifying information may include, for example, a user identification (user ID), a resource hostname, and a resource type.

An unencrypted user-provided password may be encrypted by a process associated with each resource, using an encryption algorithm specific to that resource, before storage of the encrypted password in the password registry. An encrypted password retrieved from the password registry may be decrypted by a process associated with each resource using a decryption algorithm specific to that resource.

In an embodiment, in a distributed computing system, an encryption/decryption process may execute as a "front-end" client process running locally with the password registry, and may control access to a "back-end" resource.

In an embodiment, the "front-end" client process and the password registry may run on a local "workstation" which may be used to connect to a remote "back-end" resource server. For the purposes of the present description, the term "workstation" is used in its broadest sense to describe any local system on which the "front-end" client process may run.

A user interface may be provided to manage the passwords and associated identifying information stored in the password registry.

In an aspect of the invention, there is provided a method of managing a user's passwords for a plurality of resources using a password registry associated with said user, comprising:
(i) encrypting an unencrypted user-specified password at a process associated with said each resource;
(ii) receiving an encrypted password from said process associated with said each resource;
(iii) storing said encrypted password in said password registry, such that said unencrypted user-specified password is unknown to said password registry.

In another aspect of the invention, there is provided a method of managing a user's passwords for a plurality of password protected resources accessed from a workstation over a network, comprising:
at a workstation process associated with a network accessed password protected resource:
receiving a user selected password;
encrypting said user selected password as an encrypted password;
storing said encrypted password in a password registry.

In yet another aspect of the invention, there is provided a computer readable medium having computer readable program code embedded in the medium for managing a user's passwords for a plurality of resources accessed from a workstation over a network, the computer readable program code including:
code for establishing a process at a workstation, said process acting as a front-end for a network accessed resource;
code for enabling said process to receive a user-specified password;
code for enabling said process to encrypt said user-specified password as an encrypted password and output said encrypted password, in association with identifying information, to a password registry;
code for enabling said process to receive a request from a workstation user to access said resource and to, in response, obtain said encrypted password from said password registry using said identifying information.

In another aspect of the invention, there is provided a system for managing a user's passwords for a plurality of password protected resources accessed from a workstation over a network, comprising:
at a workstation process associated with a network accessed password protected resource:
means for receiving a user selected password;
means for encrypting said user selected password as an encrypted password;
means for storing said encrypted password in a password registry.

These and other aspects of the invention will be apparent from the following more particular descriptions of exemplary embodiments of the invention.

BRIEF DESCRIPTION OF THE DRAWINGS

In the figures which illustrate exemplary embodiments of this invention.

DETAILED DESCRIPTION OF EXEMPLARY EMBODIMENTS

Figure 1:
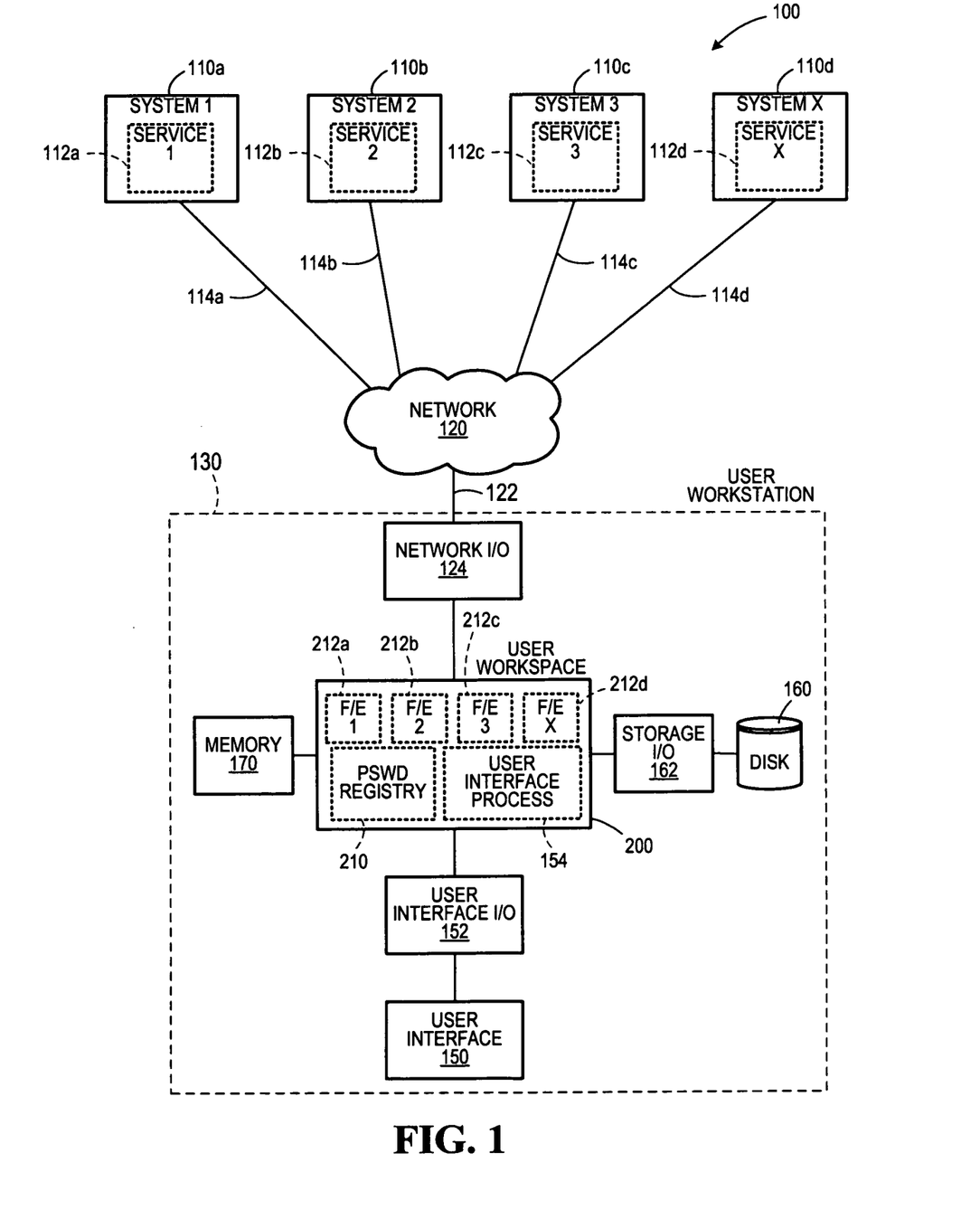
FIG. 1 is a schematic block diagram of an illustrative operating environment for exemplary embodiments of the invention.

Referring to FIG. 1, shown is an illustrative distributed data processing system 100 which may provide an operating environment for exemplary embodiments of the invention. A plurality of resources (e.g. systems 110a-110d and services 112a-112d) may be connected via suitable connections 114a-

114*d* to a network 120. A user workstation 130 may also be connected to the network 120 via a suitable connection 122. The user workstation 130 may include a network I/O module 124 for receiving the connection 122. The user workstation 130 may allocate data processing resources to a user workspace 200. The user workspace 200 may be embodied, for example, as a process running on a central processing unit ("CPU") in the user workstation 130. As shown in FIG. 1, the user workspace 200 may access a storage disk 160 via a storage I/O 162, and a memory 170. The user workspace 200 may be accessed by a user from a user interface 150 connected via a user interface I/O module 152.

In an embodiment, the user workspace 200 may include a plurality of processes 212*a*-212*d* which may be associated with the resources (systems 110*a*-110*d* or services 112*a*-112*d*). In the illustrative operating environment of FIG. 1, the processes 212*a*-212*d* may be considered as "front-end" clients to various "back-end" resource servers.

The user workspace 200 may further include a password registry 210. In an embodiment, the password registry 210 may be embodied as a process running in the user workspace 200 and have a corresponding file for storing information on the storage disk 160.

The user workspace 200 may also include a user interface process 154 for facilitating access via the user interface 150. As will be explained, the user interface process 154 may provide access to the password registry 210 for various password management functions.

Given the illustrative operating environment of FIG. 1, an exemplary embodiment in use is now described.

In the exemplary embodiment, the user workstation 130 may be used, for example, to run an integrated application development environment, or more simply, an "IDE". In the present example, the user workspace 200 may be the IDE running on the user workstation 130. The front-end processes 212*a*-212*d* may then provide an interface for various application development services 112*a*-112*d* which may be "plugged" in as extensions to the IDE.

For example, a commercially available IDE product known as the Eclipse™ workbench allows various application development tools from a number of vendors to be integrated into a single IDE. A specific example of a development tool which may be integrated into the Eclipse workbench is the Remote System Explorer ("RSE") in the commercially available "WebSphere™ Development Studio Client ("WDSc") for iSeries", which allows users to browse a file system, run commands, and view jobs on a remote iSeries/Linux/Unix or Windows system.

In an embodiment, a registration mechanism may be used by each tool vendor to register their tools with the password registry 210. In the illustrative example shown in FIG. 2, there are a number of different types of development tools which are registered with the password registry 210: tool 1, which is a tool for accessing a remote "iSeries" system type; tool 2, which is a "Linux" type; tool 3, which is a "Database" type; and tool "x" which is a "SCM" (Source Configuration Management) type. In an embodiment, each of these tools may have corresponding "front-end" process 212*a*-212*d*, respectively, running in the user workspace 200.

Figure 2:
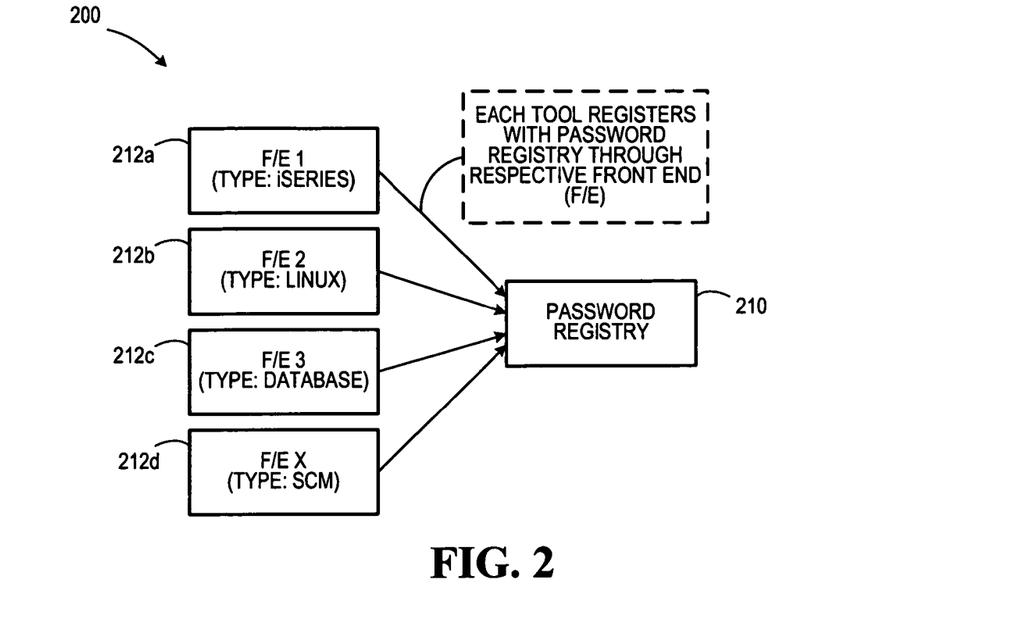
FIG. 2 is a schematic block diagram of an exemplary embodiment.

In the illustrative example, an Eclipse extension point may be provided so that each tool vendor can access the password registry 210. For further information on Eclipse extension points, the reader is directed to the Internet URL "eclipse-.org". When implementing such an extension point, two pieces of information may be required: The first piece of information is the specific resource "type" for which a tool would like to store password information. The second piece of information is a "module" which handles encrypting passwords for each resource.

In an embodiment, a number of application programming interfaces ("APIs") may be provided:
 a) An API for querying the password registry 210 for the encrypted password for a given user ID and resource.
 b) An API for storing a new user ID/password pair in the password registry 210 and removing or changing an existing pair.
 c) An API for enabling the password registry 210 to ask a registered tool (e.g. a front-end process 212*a*-212*d*) to encrypt a new password entered by the user.

In an embodiment, the first two API's, namely a) and b), may be provided by the password registry 210. The third API may be implemented by the "module" which handles encrypting passwords for each resource.

The password registry 210 never stores an unencrypted password for any of the tools. Instead, before a password is stored, the password is encrypted by each corresponding front-end process 212*a*-212*d* running in the user workspace 200.

Thus, each tool vendor can establish its own password security requirements, using whatever password encryption/decryption algorithm it wants or requires. The password registry 210 may then store the encrypted passwords regardless of the encryption algorithm used by each tool vendor. When an encrypted password is retrieved from storage 160, the encrypted password may be decrypted by a corresponding front-end process 212*a*-212*d*.

An illustrative example involving one of the development tools of FIG. 2 is now described.

Figure 3A:
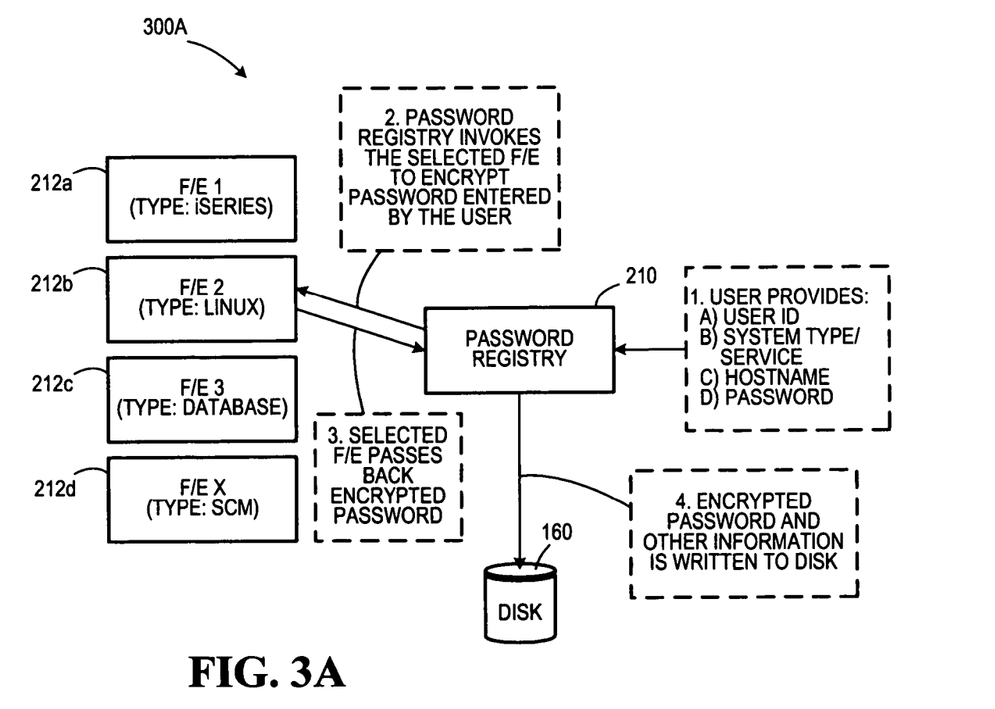
FIG. 3A is a further schematic block diagram of an exemplary embodiment.

Referring to FIG. 3A, in an embodiment, when a user uses the user interface process 154 to add a new password, the user may be asked to provide the following pieces of identifying information: a) user ID; b) resource hostname; c) resource type; and d) an unencrypted password. A suitable interface to enter this identifying information may be provided by the user interface process 154. For example, when indicating the resource type, the user may select this from a drop down menu provided by the user interface showing all registered tools (e.g. iSeries, Linux, Database, SCM). Once the user has entered this information, the password registry 210 initiates communication with one of the corresponding front-ends 212*a*-212*d*.

In this example, the password registry 210 delegates to the selected front-end 212*b* the task of encrypting the unencrypted user-specified password, using the encryption module previously identified during registration. In an embodiment, a version number may be provided with the password, so that if the encryption algorithm is changed in a future release of the tool 212*b*, old passwords may be migrated to the new encryption/decryption algorithms.

Still referring to FIG. 3A, after the unencrypted user-specified password is encrypted by the front-end 212*b*, the password registry 210 may write the user ID, resource hostname, resource type, encrypted password, and optionally the encryption/decryption version number, to the storage disk 160.

Figure 3B:
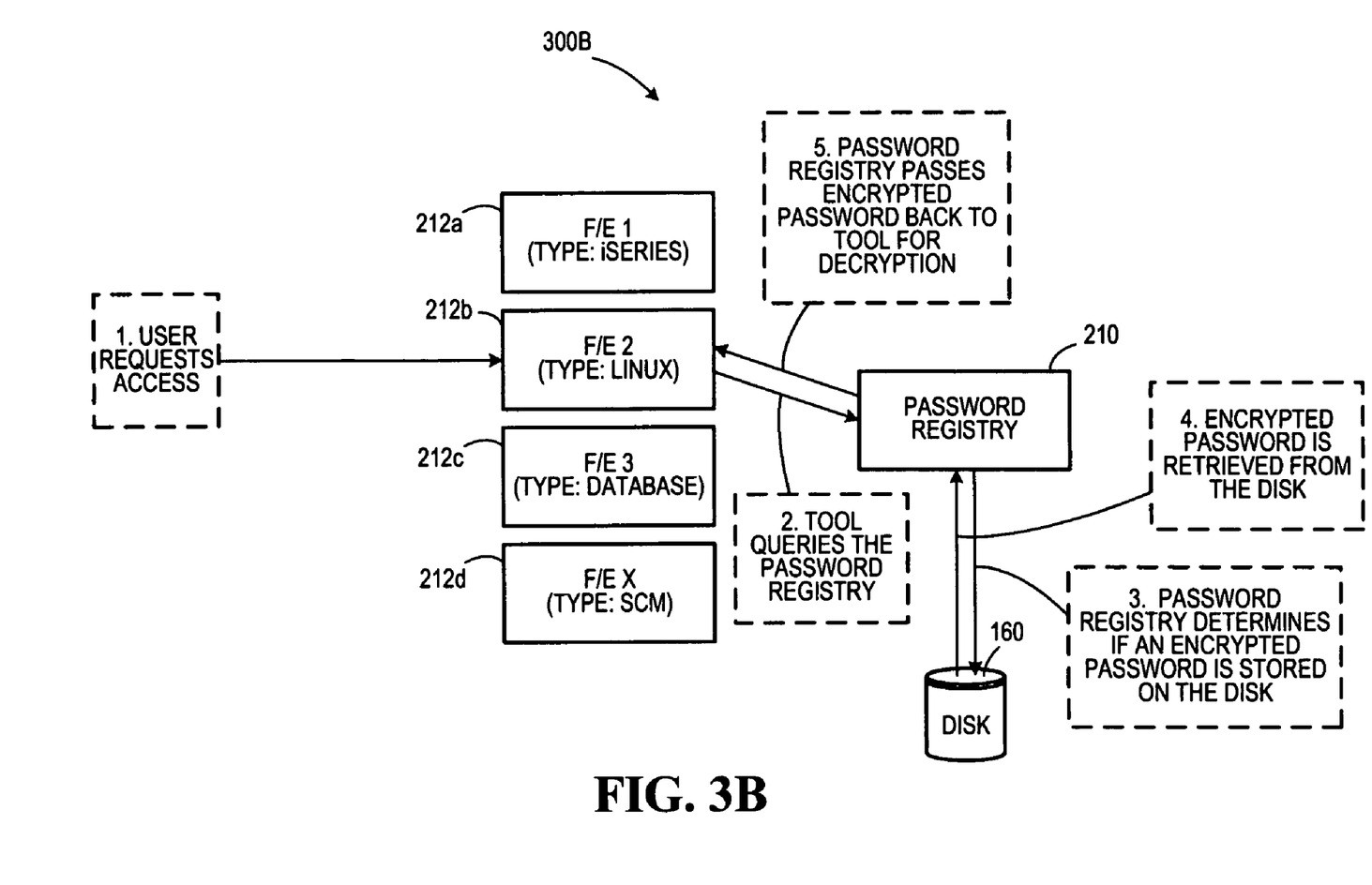
FIG. 3B is a further schematic block diagram of an exemplary embodiment.

Referring to FIG. 3B, when a user requires access to a resource, the user may initiate access directly with a front-end process 212*a*-212*d*. In the example shown in FIG. 2, the user may initiate access to the Linux tool via the corresponding front-end process 212*b*. This user-initiated access attempt may prompt the front-end process 212*b* to query the password registry 210 to see if an encrypted password for that front-end process 212*b* is available in the password registry 210. A "query key" used by the front-end process 212b for this purpose may consist, for example, of the user ID, resource type, and resource hostname. The password registry 210 in turn may access the disk 160 to determine if the corresponding encrypted password is stored on the disk 160. If a stored, encrypted password exists for this query key, then the encrypted password may be retrieved by the password registry 210 from the disk 160. The password registry 210 may then pass the encrypted password back to the front-end process 212b for decryption. A similar, corresponding access method may be used to access each of the other resources, in turn, via their respective front-ends 212a, 212c, and 212d.

In each case, since it is the front-end process 212a-212d that originally encrypted the password (FIG. 3A), the front-end process 212a-212d may also be used to decrypt the retrieved, encrypted password and allow access to an authorized user.

Only an authorized user should be able to access a password registry 210 associated with that user. For example, the user workstation 130 and/or the user workspace 200 may have its own operating system-based secure access, such that the password registry 210 containing the encrypted passwords is only available upon authorized access to the workstation 130 and/or the workspace 200. As the passwords are stored in an encrypted form that can only be decrypted by the original encrypting front-end process 212a-212d, any unauthorized access to the encrypted passwords stored on the disk 160 should not pose a risk.

In an embodiment, in order to prevent an encrypted password from being used by an unauthorized user from another workstation (not shown), the encryption key used for encrypting the password may include some form of workstation specific information so that the password registry 210 cannot be used on a different workstation. For example, a unique TCPIP address of the workstation 130 may be utilized in the encryption key.

Figure 3C:
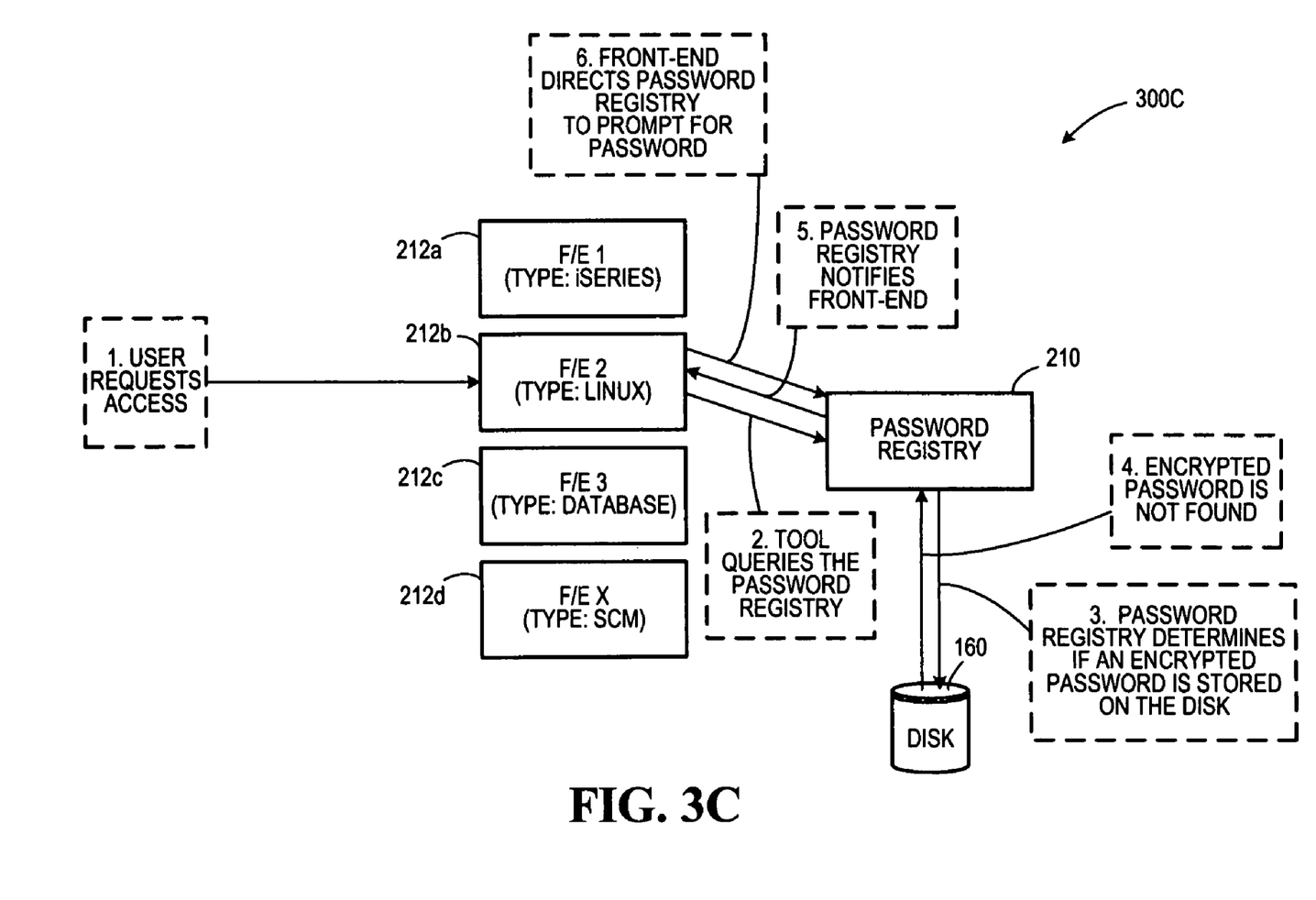
FIG. 3C is a further schematic block diagram of an exemplary embodiment.

Referring to FIG. 3C, when a user initiates access with a front-end (e.g. front-end 212b as in FIG. 3B), but an encrypted password is not found for the query key, then the password registry 210 may notify the front-end 212b. The front-end 212b may in turn notify the "back-end" (e.g. one of the services 112a-112d systems 110a-110d), which may in turn prompt the user to enter a user ID and password via the password registry 210. In this case, the tool vendor can use an API provided by the password registry 210 for storing this information onto the disk 160. Prior to such storage, each front-end process 212a-212d may encrypt the unencrypted user-specified password using a specific encryption algorithm, as shown in FIG. 3A.

In an embodiment, the user can also access the password registry 210 via the user interface process 154 to store, modify, and delete information for accessing each back-end resource (e.g. systems 110a-110d and services 112a-112d). In each case, the password registry 210 will not store an unencrypted password on the disk 160, and it will be the front-end process 212a-212d that encrypts and decrypts the passwords based on a specific encryption/decryption algorithm.

While a distributed data processing system has been described in the above example, the invention may be practiced in a centralized data processing system in which multiple passwords and user IDs are required for secure storage in a password registry. In this case, the encryption/decryption processes may be co-located with the systems and services.

The descriptions in this specification are for purposes of illustration only and are not to be construed in a limiting sense. Therefore, the scope of the invention is limited only by the language of the following claims.

What is claimed is:

1. A method of managing password for a plurality of software resources accessible by a user, said method comprising:
    providing a password registry for storing passwords within a workstation;
    allowing each of a plurality of software resources to register its password in said password registry via a respective one of a plurality of front-end processes within said workstation, wherein each said password is encrypted by said respective front-end process before being stored in said password registry;
    in response to an access request to one of said software resources via a corresponding one of said front-end processes, determining if an encrypted password associated with said requested software resource is stored in said password registry;
    in a determination that said encrypted password associated within said requested software resource is stored in said password registry, sending said encrypted password from said password registry to said corresponding front-end process, said corresponding front-end process decrypting the encrypted password and permitting said access request based on the decrypted password by the front-end process; and
    in a determination that said encrypted password associated within said requested software resource is not stored in said password registry, notifying said front-end process resulting in prompting for a password from a user.

2. The method of claim 1, wherein said method further includes associating each of said encrypted passwords with an identifying information.

3. The method of claim 2, wherein said identifying information includes at least one of a user ID, a resource hostname, and a resource type.

4. The method of claim 3, wherein said method further includes utilizing at least one of said user ID, said resource hostname, and said resource type as a query key to uniquely identify said each software resource and its associated encrypted password.

5. The method of claim 4, wherein said method further includes retrieving a corresponding one of said encrypted passwords using said query key.

6. A computer readable storage medium having computer program product for managing passwords for a plurality of software resources accessible by a user, said computer readable medium comprising:
    computer program code for providing a password registry for storing passwords within a workstation;
    computer program code for allowing each of a plurality of software resources to register its password in said password registry via a respective one of a plurality of front-end processes within said workstation, wherein each said password is encrypted by said respective front-end process before being stored in said password registry;
    computer program code for, in response to an access request to one of said software resources via a corresponding one of said front-end processes, determining if an encrypted password associated with said requested software resource is stored in said password registry;
    computer program code for, in a determination that said encrypted password associated within said requested software resource is stored in said password registry, sending said encrypted password from said password registry to said corresponding front-end process, said corresponding front-end process decrypting the encrypted password and permitting said access request based on the decrypted password by the front-end process; and computer program code for, in a determination that said encrypted password associated within said requested software resource is not stored in said password registry, notifying said front-end process resulting in prompting for a password from a user.

7. The computer readable medium of claim 6, wherein said computer readable medium further includes computer program code for associating each said encrypted password with an identifying information.

8. The computer readable medium of claim 7, wherein said identifying information includes at least one of a user ID, a resource hostname, and a resource type.

9. The computer readable medium of claim 8, wherein said computer readable medium further includes computer program code for utilizing at least one of said user ID, said resource hostname, and said resource type as a query key to uniquely identify said each software resource and its associated encrypted password.

10. The computer readable medium of claim 9, wherein said computer readable medium further includes computer program code for retrieving a corresponding one of said encrypted passwords using said query key.

\* \* \* \* \*

UNITED STATES PATENT AND TRADEMARK OFFICE
CERTIFICATE OF CORRECTION

PATENT NO. : 7,650,632 B2  Page 1 of 1
APPLICATION NO. : 10/809563
DATED : January 19, 2010
INVENTOR(S) : Donald J. Yantzi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1198 days.

Signed and Sealed this

Twenty-third Day of November, 2010

David J. Kappos
*Director of the United States Patent and Trademark Office*